May 9, 1961 C. A. WINSLOW 2,983,384
CENTRIFUGING AND LUBRICANT-PURIFYING DEVICE
Filed May 7, 1958 3 Sheets-Sheet 1

MAGNESIUM SHELL EXPENDIBLE

INVENTOR.
CHARLES A. WINSLOW
BY
ATTORNEY.

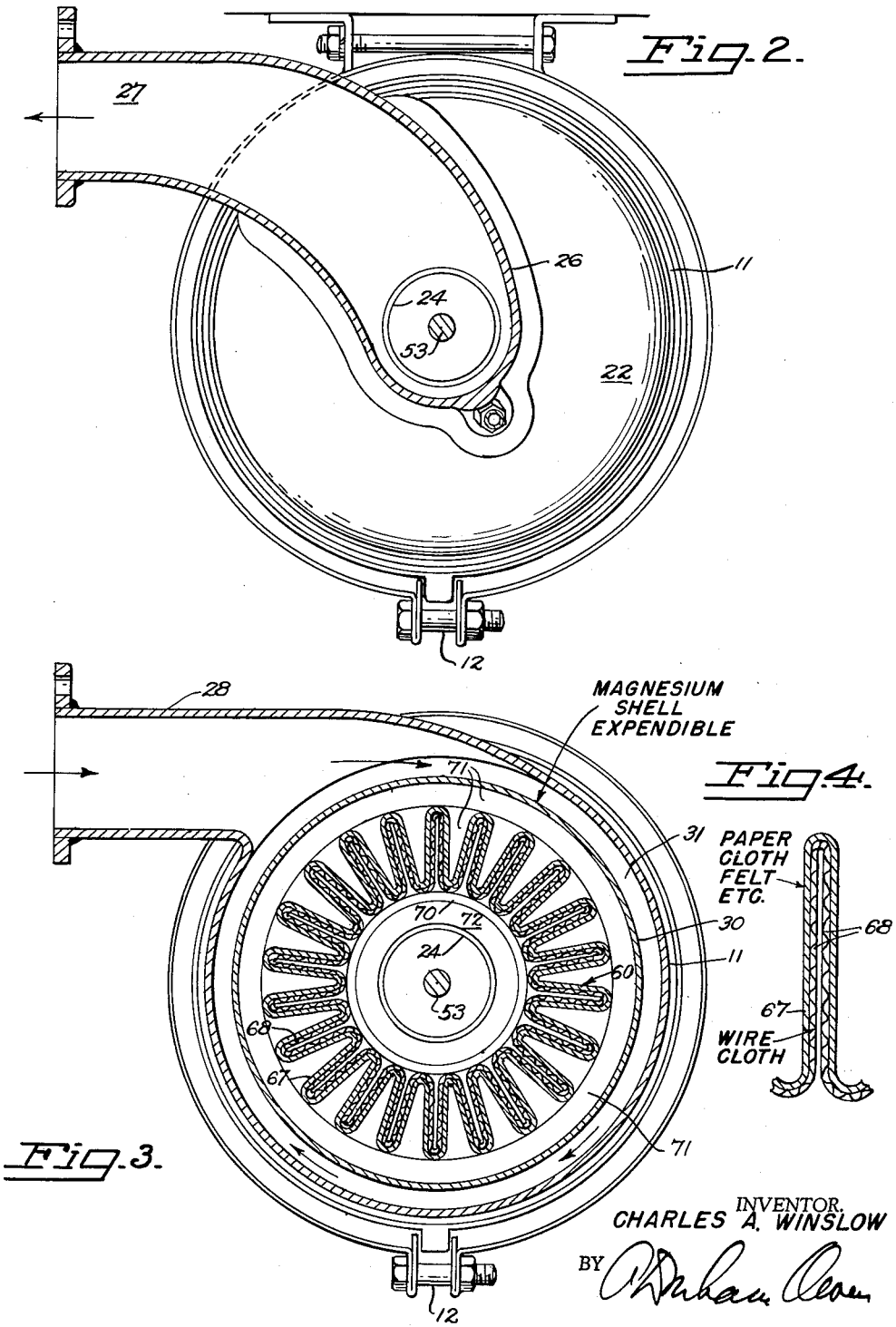

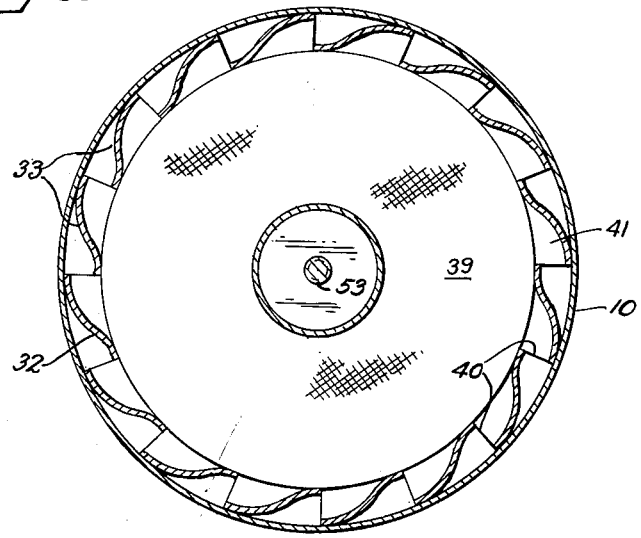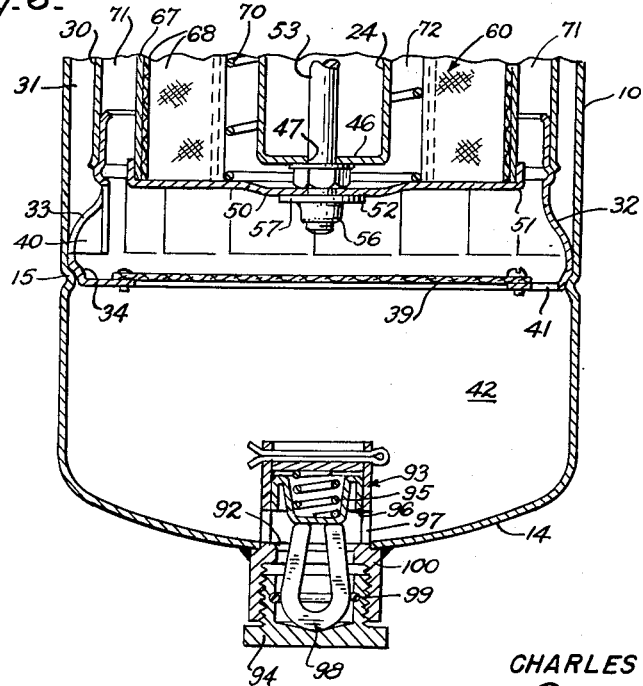

United States Patent Office 2,983,384
Patented May 9, 1961

2,983,384

CENTRIFUGING AND LUBRICANT-PURIFYING DEVICE

Charles A. Winslow, Oakland, Calif.
(205 Martinique Ave., Paradise Cay, Tiburon, Calif.)

Filed May 7, 1958, Ser. No. 733,664

11 Claims. (Cl. 210—132)

This invention relates to an improved centrifuging and lubricant-purifying device.

One object of the present invention is to provide a single device, taking up a relatively small amount of space, for purifying lubricant, such as oil, from heavy particles, such as lead salts, from corrosive constituents, and from other foreign matter, and for simultaneously defoaming it and returning clean de-aerated oil to an engine or reservoir.

Another object of the invention is to provide an unusually convenient liquid-defoaming and liquid-purifying device, wherein the elements are easily replaced. Only a single clamping device needs to be removed, and not only are the filter cartridges replaceable, but also an expendable sleeve that frees the oil from corrosive agents.

Another object of the invention is to provide a centrifugal-type filter wherein a tangentially entering stream of oil is passed through a novel structure to achieve unusually large velocity that helps to eject heavy particles from the oil by centrifugal force.

Another object of the invention is to provide a satisfactory filter having a permeable, radially corrugated element of paper, cloth, felt or similar materials. In the prior art such elements tended to fail by having their sections close in on themselves and reducing the surface area available for filtering. The corrugated element of this invention is combined with a supporting foraminous member that prevents such collapse and provides a continuous free passage for filtered oil, and thereby extends the life of the filter element many times.

Another object of the invention is to provide a lubricant-purifying unit wherein the oil can be sampled to check its status and thereby the status of the engine, as well as that of the filter.

Another object of the invention is to provide a novel bypass valve located in a novel position, for bypassing only the cleanest portion of the oil if the filter should become clogged.

Another object of the invention is to provide a relatively large primary contact surface whereon hot dirty oil with its contained air, gases, corrosive agents, and so on impinge as it rotates, thus cooling and coalescing or condensing some of the acids, moisture, and similar components and coagulating finely divided foreign particles such as lead salts, carbon, and metal.

Another object of the invention is to impinge the dirty oil with its contained impurities upon a relatively large surface of a metal that is very much more susceptible to corrosive action than are the metals and other materials in the engine, thereby providing an inexpensive expendable means for preventing corrosion in lubricated working surfaces of engines.

Other objects and advantages of the invention will be understood from the following description of a preferred embodiment thereof.

In the drawings:

Fig. 2 is a view in horizontal section taken along the line 2—2 in Fig. 1.

Fig. 3 is a view in horizontal section taken along the line 3—3 in Fig. 1.

Fig. 4 is a fragmentary enlarged view in horizontal section of a portion of Fig. 3, showing one corrugation of the filter element.

Fig. 5 is a view in horizontal section taken along the line 5—5 in Fig. 1.

Fig. 6 is a fragmentary view in vertical section of the lower portion of a modified form of the invention showing a modified form of chip trap.

Figure 1:
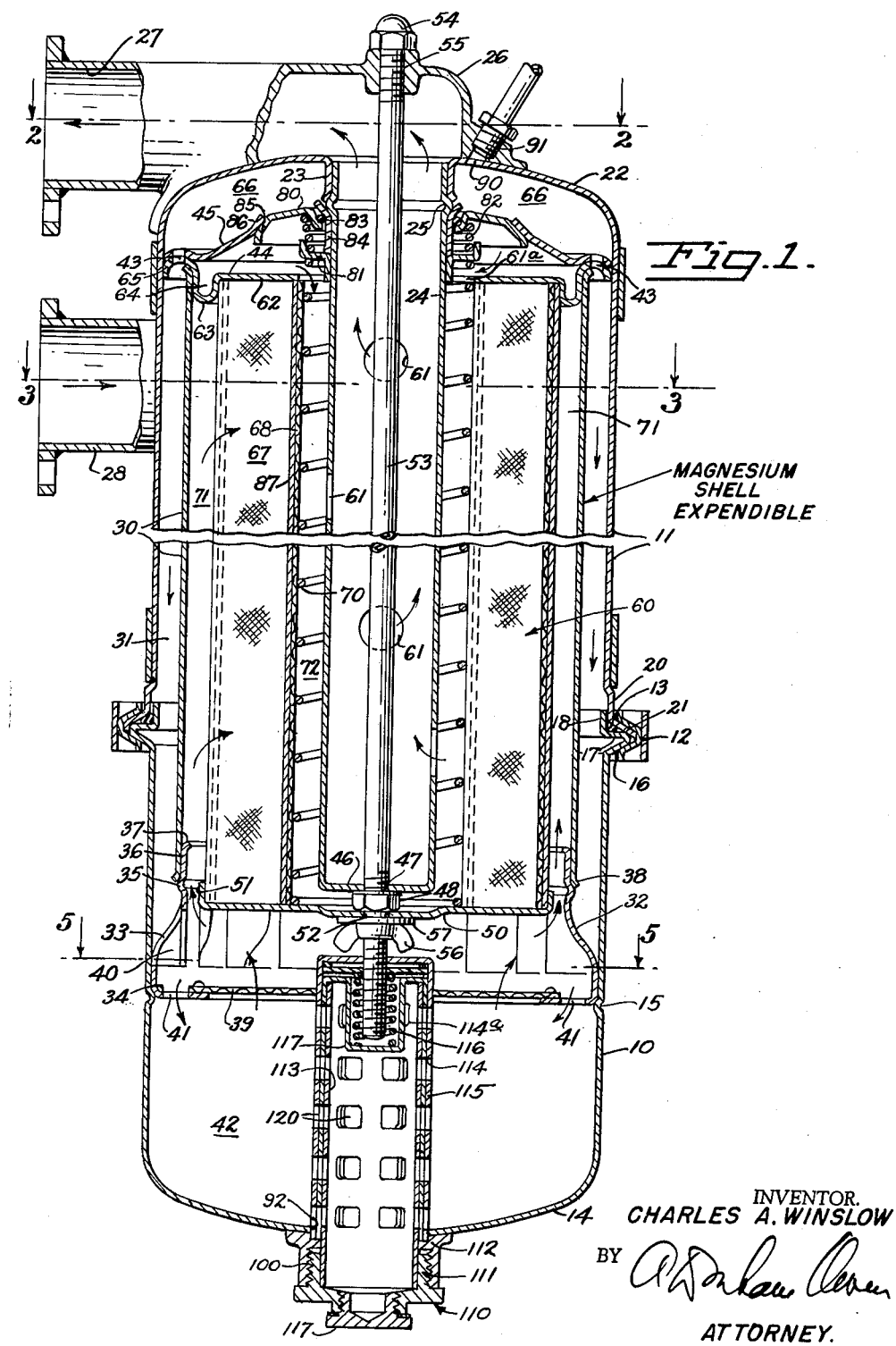
Fig. 1 is a view in elevation and in vertical section of a lubricant purifying apparatus embodying the principles of the invention.

My new lubricant purifier includes a lower housing member 10 joined to an upper housing member 11 by a Marmon clamp 12 with a sealing gasket 13 between the two housing members. The generally cylindrical lower housing 10 has a sloping bottom wall 14, and a circular rib 15 is preferably impressed in its sidewall. Its upper end is formed to provide an outwardly extending frusto-conical flange 16, a radially inwardly extending portion 17, and an upwardly extending cylindrical portion 18.

The upper housing member 11 is outwardly flared near the bottom to provide a wider cylindrical portion 20 and an outwardly flared frusto-conical end flange 21 that is engaged by the Marmon clamp 12. The gasket 13 seals between the portions 17 and 18 on the lower housing member 10 and the portions 20 and 21 on the upper housing member 11.

The upper housing member 11 has an upwardly sloping top wall 22 terminating in a downwardly extending cylindrical tube 23. The upper end of a central tube 24 fits in the tube 23 and is vertically positioned with respect thereto by a circumferential bead 25 in the tube 24 engaging the lower end of the tube 23. An outlet housing 26 secured to the upper end of the housing member 11 has a radially extending outlet passage 27 into which the central tube 24 leads.

The upper housing 11 is also provided with a tangential inlet fitting 28. Oil entering this tangential inlet, shown best in Fig. 3, is immediately given a centrifugal action by its tangential entering path and by contact with the cylindrical wall of the housing member 11. This centrifugal action is enhanced by a shell 30, which is concentric with the housing member 11 and spaced radially inwardly from it to provide an annular cylindrical passage 31. The shell 30 is preferably made from magnesium or other easily corrodible metal. Entering oil containing acidic impurities is impelled against and contacts the magnesium shell 30. The relatively narrow passage 31 insures close contact with the shell 30, and the resultant reaction of any acidic constituents on the magnesium forms magnesium salts. This reaction neutralizes the acid in the oil, so that it will not later etch the bearings.

The magnesium shell 30 is replaceably supported on a ring 32 which is preferably formed as shown in Fig. 5 to provide stationary turbine blades 33. These blades 33 act to impart to the oil a tremendous velocity. This support ring 32 has an inturned lower end portion 34 that rests on the cylindrical rib 15 of the lower housing member 10, while its upper end is formed with a circular rib 35 and an upwardly extending guide portion 36 that preferably is inturned at its upper end 37 to provide a guide for the outwardly flared lower end 38 of the magnesium shell 30. Thus, with a simple slip fit, the portion 38 slides over the portion 36 and is stopped by the rib 35. The magnesium shell 30 is readily installed or removed for replacement, and the ring 32 may also be removed if desired.

Considering the operation to this point, the entering oil is whirled in the chamber 31 between the magnesium acid-neutralizing shell 30 and the housing walls 11 and 10. When it reaches the bottom of the shell 30, still whirling, it passes through openings 40 in the turbine blades 33, which impart a tremendous velocity and rotary motion to the oil. The passages 40 between the turbine blades 33 are restricted enough to cause a predetermined top pressure, governed by a pressure release valve at the upper end of the device and soon to be described. The initial high rotary motion is accelerated when the oil passes through the restricted openings in the turbine blades, causing any material which can be centrifuged, such as carbon particles, metal, lead salts, etc., to be forced radially outwardly, whence they fall down through the passages 40 and an annular passage 41 into a sump 42 in the lower end of the shell 10. Thus, pressure at the inlet 28 causes the whirling mass to be forced down past the turbine 32, and the heavy portions of this rapidly rotating mass are forced radially out and down. A screen 39, lying radially within the passage 41, defines the top of the sump 42 and prevents large particles from working back up after they have once passed through the openings 41.

Meanwhile, the air in the oil ascends in the passage 31, going upwardly to a plurality of openings or passages 43 provided through annular members 44 and 45. The parts all cooperate in aligning each other, as is shown by the fact that the element cap 44 and annular ring and valve seat 45 are supported by the filter cartridge 60, the shell 30, and the housing member 11. The central perforate tube 24, positioned in the annular cylindrical portion 23, has a lower end 46 provided with a bolt opening 47 and spaced by a nut 48 above an element cap plate 50. The cap plate 50 extends radially outwardly, having an upturned outer periphery 51 and a central opening 52. An elongated bolt 53 extends from a head or nut 54 above an opening 55 in the outlet housing 26 down through the tube 24. The lower end of the bolt 53 extends through the openings 52 and is fastened by a wing nut 56 to the lower end of the cap plate 50, with a spring washer 57 therebetween if desired.

A filter cartridge 60 is mounted on the plate 50 with its upper end supporting and closed by and aligned by the plate 44. Oil can get into the perforate tube 24 through its perforations 61 only by first passing through the filter cartridge 60. The plate 44 has an annular flat inner portion 62, a circular depressed rib 63 that helps hold it securely to the upper end of the filter 60, and also forms an annular guide rim for the shell 30. The plate 44 also has a raised outer rib 64, whose outer periphery terminates in a curved-over edge 65 that fits snugly against the housing member 11, thereby spacing and centralizing the upper end of all the units in the shell 11. The plurality of openings 43 through the rib 64 extend from the annular space 31 into a chamber 66 above the filter cartridge 60 and above a spring pressed by-pass valve 80, to be discussed later.

The filter cartridge 60 may be made from any well-known filter material, and can be an element such as that shown in Patent No. 2,559,267. In the drawings a novel type of corrugated filter material 67 such as cardboard, paper, cloth, or felt is shown supported on a screen base 68 which holds the filter sheets apart at all times. The base 68 is relatively stiff and is not compressible like the filter material 67. Upon compression of conventional filter sheets, nine-tenths of the filter area available would normally be closed, but by using the screen support 68, this is prevented and accurate free-flow filtering is maintained at all times.

A spring 70 around and spaced from the tube 24 keeps the cartridge 60 in place relative to the tube 24. Oil can pass from the space 71 in between the cartridge 60 and the magnesium shell 30 through the filter medium 67 and screen 68 into the space 72 inside the filter 60. Thence the filtered oil flows through the openings 61 into the tube 24, whence it flows upwardly to the outlet 27.

In the chamber 66 is a by-pass valve arrangement comprising the stationary seat member 45 and a movable valve member 80, whose inner end fits around the tube 24. A spring bearing member 81 also fits around the tube 24, and a spring 82 is compressed between the members 80 and 81. A gasket 83 and sleeve 84 are provided to prevent leakage between the tube 24 and the valve member 80. An outer downturned rim 85 of the valve member 80 normally engages an inner peripheral rim 86 of the seat member 45 and prevents passage of fluid therebetween. However, when the oil pressure on the inlet side of the filter cartridge 60 becomes excessive, the pressure in the chamber 66 builds up against the valve member 80 and forces it down against the pressure of the spring 82, thereby opening the valve 80 to pass oil directly from the inlet 28, through the opening 43, chamber 66, between the valve 80 and its seat 45, and thence through the openings 61 and 61a and into the tube 24 and thence to the outlet 27. During normal operation, of course, the by-pass valve 80 is closed.

When the invention is used in a conventional dry-sump aircraft engine when air and oil are purified through the unit, the upper part of the chamber 66 normally includes an air outlet or vent 90 of controlled and restricted size, an orifice 91 of the desired size being provided so that not only is a restricted flow of air let out through the outlet 90 but pressure is built up by the restricted air. It prevents free passage of air and prevents passage of oil through the outlet 90. Operation is like that in Patent 2,811,220. A balanced back pressure of air is built up in the chamber 66, which aids in forcing oil through the filter 60. It also allows the escape of air and blow-by gases through the restricted vent 90. Thus de-aeration and filtering are accomplished simultaneously in a very simple and practical manner.

The bottom of the sump 42 is provided with a drain opening 92, comprising a chip trap indicated generally at 93 (Fig. 6). The chip trap 93 is closed by a drain plug 94. When the plug 94 is screwed out, a spring 95 forces a tubular valve 96 down, closing ports 97. When the plug 94 is screwed in, a magnet 98 engages the cupped valve 96 and pushes it up against the spring 95 and opens the ports 97. The magnet 98 and cupped chip trap plug 94 are preferably held together by a snap ring 99, and the chip trap 93 is preferably welded at 100 to the lower housing 10 at the bottom thereof. Thus, whenever the cupped plug 94 and its magnet 98 are removed, a sample of the sludge in the filter sump 42 is obtained, without draining the entire filter. Such sampling is very important, not only for disclosing the amount of sludge in the sump 42, therefore indicating whether the filter should be replaced and the sump drained, but also in disclosing the condition of the engine. For example, the presence of any metal indicates trouble caused by failure of some bearing or other internal working part. A prompt detection of metal in the chip trap can save money and difficulties by preventing the development of serious trouble or total engine failure, with possible loss of aircraft and of lives. In the event that it is necessary to drain the filter, the valve 96 is held up off of its seat until the sump 42 is empty.

A modified form of chip trap and drain plug assembly 110 shown in Fig. 1 has a cupped chip trap 111 threaded into a fitting 112 that is welded to the bottom 14 of the housing member 10. An inner perforated tube 113 is preferably welded to the cupped trap 111 and fits slidably inside an outer shell 115, engaging a valve 114 between the inner part 113 and the outer part 115, which has a cup portion 117 to compress a spring 116. In operation, removal of the cupped trap 110 and its inside tube 113 carries a sample from the sump 42, or the filter can be drained by removing a drain plug 117. When the cup 111 is removed instead, the spring 116 acts to force down the cylindrical ported valve 114, shutting off the ports 120 and preventing the filter from draining.

Upon removal of the sample, the engineer can determine the composition of the solid sludge remaining in any strata at the bottom of the filter sump. In other words, if a bearing goes out after a two-inch depth of sludge was caught in the sump, metal would show in the cup 111.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

I claim:

1. A lubricant purifying device, including in combination: a generally cylindrical vertical housing having a generally tangential inlet and a central outlet; a horizontal ring comprising a series of stationary turbine blades supported by and inside said housing spaced below the inlet; a cylindrical shell of magnesium alloy supported by said ring and extending toward and up beyond said inlet, said shell being of smaller diameter than said housing to provide an annular chamber therebetween; a screen supported adjacent said turbine blades and spaced inwardly therefrom to provide an annular passage therearound and to provide a sump below said screen; a vertical filter cartridge supported above said screen and within and spaced from said shell; conduit means connecting the interior of said cartridge with said central outlet opening; means above said filter cartridge and above said shell providing an upper chamber connected to said annular chamber; an air-restricting orifice in the upper end of said upper chamber; a spring-urged, normally closed by-pass valve connecting said upper chamber to said conduit means; and a chip-trap sampler in said sump.

2. A lubricant purifying device, including in combination: a generally cylindrical housing having a generally tagential inlet and an axial outlet; a shallow ring comprising a series of stationary turbine blades supported by and inside said housing spaced from the inlet and perpendicular to the axis of the housing; a cylindrical shell supported by said ring and extending toward and beyond said inlet, said shell being of smaller diameter than said housing to provide an annular chamber therebetween, said blades defining one end of said chamber; a generally cylindrical filter cartridge supported within and spaced from said shell; and conduit means connecting the interior of said cartridge with said axial outlet opening.

3. The device of claim 2 wherein said shell is made from acid-corrodible metal of the group consisting of magnesium and its alloys, so as to neutralize acids in the lubricant.

4. A lubricant purifying device, including in combination: a generally cylindrical vertical housing having a generally tangential inlet and a central outlet; a horizontal ring comprising a series of stationary turbine blades supported by and inside said housing spaced below the inlet; a cylindrical shell supported by said ring and extending toward and up beyond said inlet, said shell being of smaller diameter than said housing to provide an annular chamber therebetween; a vertical filter cartridge supported within and spaced from said shell; conduit means connecting the interior of said cartridge with said central outlet opening; an air-restricting orifice in said upper end wall to let a restricted amount of air out therefrom and to build up air pressure in said housing when blocked or when the air flowing is in excess of the amount let out; and a spring-urged, normally closed by-pass means above the upper end of said shell connecting said annular chamber to said conduit means.

5. A lubricant purifying device, including in combination: a housing having a vertical cylindrical wall with a generally tangential inlet, a bottom end wall with a central drain opening therethrough, and an upper end wall with a central outlet opening therethrough; a ring supported by and inside said housing in the lower end thereof above said bottom end wall and having a series of stationary turbine blades therethrough; an easily corrodible metal cylindrical shell supported by said ring and extending upwardly to a level above said inlet, said shell being of smaller diameter than said housing to provide an annular chamber therebetween and easily corrodible by engine-produced acids in lubricating oil; a screen supported horizontally below said turbine blades and spaced inwardly therefrom to provide an annular passage therearound and providing a sump below said screen; a vertical filter cartridge supported above said screen and within and spaced from said shell and comprising closed upper and lower ends and a foraminous annular vertical supporting body; a conduit means connecting the interior of said cartridge with said central outlet opening; an upper annular member above said shell and said filter cartridge and around said conduit means providing an upper chamber between itself and said upper end wall and connected to said annular chamber; an air-restricting orifice in the upper end of said upper housing to help build up air pressure in said housing; a spring-urged, normally closed by-pass valve through said upper annular member connecting said upper chamber to said conduit means; and a chip-trap sample in said sump comprising a cupped plug for said drain opening, a perforated housing supported by said housing around and above said drain opening, valve means for closing the perforations of said perforated housing, spring means for urging said valve means to a normally closed position, and means supported by said cupped plug for engaging said valve means and forcing them to open position when said plug is in place.

6. A lubricant purifying device, including in combination: a housing having a bottom end and a circumferential rib spaced thereabove and extending radially inwardly, an upper end with a central opening therethrough, and a vertical cylindrical wall with an inlet fitting therethrough a substantial distance above said rib and generally tangential to said housing; a shallow horizontal ring supported by said rib and having a series of stationary turbine blades therethrough; a cylindrical shell supported by said ring and extending upwardly and above said inlet, said shell being of smaller diameter than said housing to provide an annular chamber therebetween, said blades being between said cylindrical wall and said cylindrical shell; a screen supported horizontally below said turbine blades and substantially on a level with said rib and spaced inwardly therefrom to provide an annular passage therearound and dividing said lower housing to provide a sump below said screen; and a filter cartridge spaced inwardly from said shell and above said screen with outlet means connected to said central opening.

7. The device of claim 6 wherein said sump has a drain opening in its lower end and a chip-trap sampler comprising a cupped plug for said drain opening, a perforated cylindrical member in said sump supported by said housing around and above said drain opening, valve means for closing the perforations of said cylindrical member, spring means for urging said valve means to a normally closed position, and means supported by said cupped plug for engaging said valve means and forcing them to open position when said plug is in place.

8. A lubricant purifying device, including in combination: a vertical cylindrical housing having closed upper and lower ends, a tangential inlet and an outlet; a shallow horizontal ring supported below said inlet and having a series of stationary turbine blades therethrough; a cylindrical shell supported by said ring and extending upwardly and above said inlet, said shell being of smaller diameter than said housing to provide an annular chamber therebetween, said turbine blades lying between said shell and said housing; and a filter cartridge spaced inwardly from said shell and above said ring with outlet means connected to said housing outlet.

9. A lubricant purifying device, including in combination: a vertical cylindrical housing having a tangential inlet, an outlet, and closed upper and lower end walls; a cylindrical shell of smaller diameter than said housing to provide an annular chamber therebetween and spaced from said lower end wall; a screen supported horizontally below said shell to provide a sump below said screen, said sump having a drain opening through said lower end wall; a filter cartridge spaced inwardly from said shell and above said screen with outlet means connected to said housing outlet; and a chip-trap sampler in said sump comprising a cupped plug for said drain opening, a perforated cylindrical member in said sump supported by said housing around and above said drain opening, valve means for closing the perforations of said cylindrical member, spring means for urging said valve means to a normally closed position, and means supported by said cupped plug for engaging said valve means and forcing them to open position when said plug is in place.

10. A lubricant purifying device, including in combination: a housing, comprising upper and lower cylindrical housing members held together by a Marmon clamp, said lower housing having a bottom end and a circumferential rib spaced thereabove and extending radially inwardly, with a central opening through said lower end, said upper housing having an upper end with a central opening therethrough; an inlet fitting leading through the vertical cylindrical wall of said housing a substantial distance above said rib and generally tangential to said housing; a ring supported by said rib and having stationary turbine blades therethrough; an easily corrodible metal cylindrical shell supported by said ring and extending upwardly and above said inlet, said shell being of smaller diameter than said housing to provide an annular chamber therebetween; a screen supported horizontally below said turbine blades and substantially on a level with said rib and spaced inwardly therefrom to provide an annular passage therearound and dividing said lower housing to provide a sump below said screen; a vertical filter cartridge comprising a foraminous annular supporting body, corrugated as seen in horizontal cross section with vertical walls, and a cardboard filter element supported by said body so as to prevent collapse of said filter element and plugging by closing against itself; a bottom plate supporting the lower end of said filter cartridge; an upper annular element supporting the upper end thereof; a vertical perforated tube extending from said bottom plate up to engagement with said central opening through said upper housing; an outlet fitting communicating with said central opening of said upper housing and said tube; a helical spring around said tube for supporting said filter cartridge away therefrom; an upper annular member above said filter cartridge and around said tube dividing said upper housing and providing an upper chamber and having passage means leading from said annular chamber; an air-restricting orifice in the upper end of said upper housing to let air out from said upper chamber and to build up air pressure in said housing; a by-pass valve through said upper annular member comprising an opening in said upper annular member, an annular plate normally closing said opening, a bearing member supported by said helical spring, and a spring between said bearing member and said annular plate; and a chip-trap sampler in said sump comprising a cupped plug for said central opening through the lower end of said housing, a perforated cylindrical member in said sump supported by said lower housing around and above said central opening, valve means for closing the perforations of said cylindrical member, spring means for urging said valve means to a normally closed position, and means supported by said cupped plug for engaging said valve means and forcing them to open position when said plug is in place.

11. The device of claim 9 wherein said means supported by said cupped plug comprises a magnet which, in addition to holding said valve in open position when said plug is in place, also collects and holds ferromagnetic material.

References Cited in the file of this patent

UNITED STATES PATENTS

| | | |
|---|---|---|
| 922,657 | Worsey | May 25, 1909 |
| 1,752,050 | Young | Mar. 25, 1930 |
| 1,806,001 | Simms | May 19, 1931 |
| 1,963,200 | Hawley | June 19, 1934 |
| 2,001,610 | Hildenbrand | May 14, 1935 |
| 2,013,776 | Wiesman | Sept. 10, 1935 |
| 2,170,074 | Hewitt | Aug. 22, 1939 |
| 2,279,423 | Vokes | Apr. 14, 1942 |
| 2,345,029 | Brooks | Mar. 28, 1944 |
| 2,598,322 | Vokes | May 27, 1952 |
| 2,638,228 | Downey | May 12, 1953 |
| 2,646,884 | Findley | July 28, 1953 |
| 2,704,156 | Botstiber | Mar. 15, 1955 |
| 2,811,220 | Winslow | Oct. 29, 1957 |
| 2,822,926 | Walton | Feb. 11, 1958 |
| 2,823,804 | Myring | Feb. 18, 1958 |